W. E. SHARP.
METHOD OF FORMING LOCK NUTS.
APPLICATION FILED NOV. 8, 1913.
1,174,294.
Patented Mar. 7, 1916.
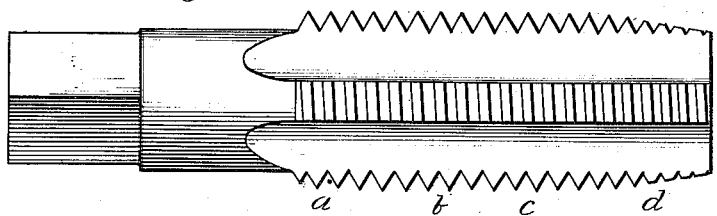
Fig. 1
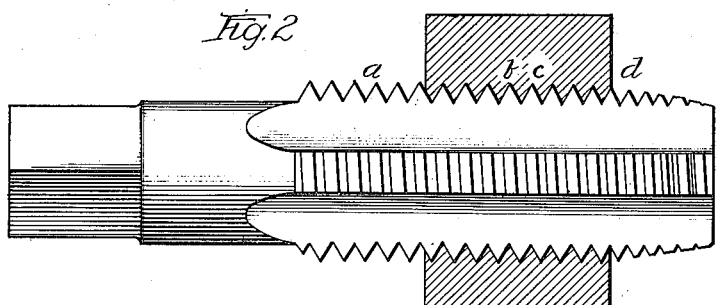
Fig. 2
Fig. 3
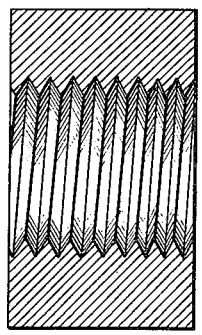
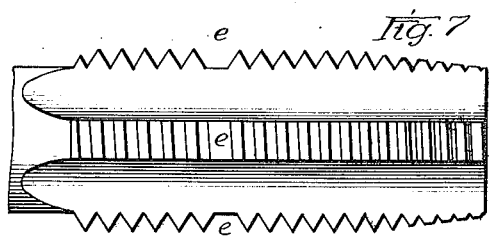
Fig. 7
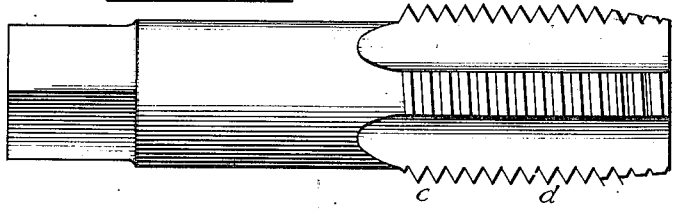
Fig. 5
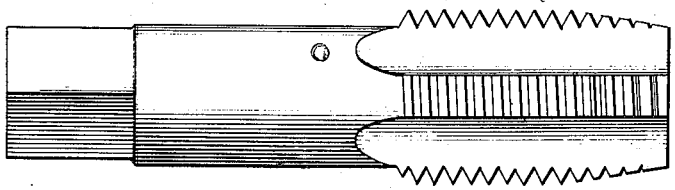
Fig. 6
Witnesses:
Arthur W. Carlson
Charles J. Cobb
Fig. 4
Inventor
William E. Sharp
By Hill & Hill Attys

UNITED STATES PATENT OFFICE.

WILLIAM ERASTUS SHARP, OF CHICAGO, ILLINOIS, ASSIGNOR TO GRIP NUT COMPANY, OF CHICAGO, ILLINOIS, A CORPORATION OF ILLINOIS.

METHOD OF FORMING LOCK-NUTS.

1,174,294.  Specification of Letters Patent.  Patented Mar. 7, 1916.

Application filed November 8, 1913. Serial No. 799,870.

*To all whom it may concern:*

Be it known that I, WILLIAM E. SHARP, a citizen of the United States, residing at Chicago, in the county of Cook and State of Illinois, have invented certain new and useful Improvements in the Method of Forming Lock-Nuts, of which the following is a description.

My invention belongs to that general class of lock nuts, in which the nut is so constructed that it may be readily started upon a bolt by the fingers until it reaches a point where it binds or contacts in such a manner with the bolt or its threads as to require an effort to properly set it, practically binding the same in position and preventing its accidental disengagement.

To this end my invention consists in the peculiarly formed nut, and the method of forming the same, more particularly pointed out in the claims.

In the drawings, wherein like reference characters indicate like or corresponding parts, Figure 1 is a side elevation of a tap of peculiar construction, particularly adapted to form my improved nut; Fig. 2 is a similar view, showing a nut thereon in section, illustrating the method of cutting the same; Fig. 3 is a transverse section of a nut, constructed in accordance with my improved form, somewhat exaggerated to make clear the construction; Fig. 4 illustrates what might be called the curve of the normal line of the thread from the abnormal line of the same, or vice versa, illustrating the spring contact effect of the construction shown; Figs. 5 and 6 illustrate separate taps constructed to coöperate when used successively to form the same type of nut, and Fig. 7 shows a tap similar to the form shown in Fig. 1, but with one cutter line removed.

In the drawings, Fig. 1 illustrates a tap, which, for illustration, may be so formed that the portion of the cutting part of the tap to the left, as at $a$—$b$, is tapped to form the thread in the nut in the usual manner, of standard size and pitch to fit upon the bolt threaded to coöperate therewith, while the advancing or front part of the tap, as at $c$ and $d$, is formed to cut what might be called an abnormal thread, or a thread varying in pitch or form to the thread upon the bolt which the nut is to be used. It will be seen that in using this tap, the first action is to cut an abnormal thread through the nut, resulting from the action of the advancing part of the tap at $c$—$d$. The following part of the tap, however, is intended to re-cut the thread part way through the nut, so that the thread will to this extent properly engage with the thread upon the bolt. The change from one pitch of the tap to the other is preferably abrupt, and the change from one pitch or form of thread to the other is preferably the same.

The effect in cutting the nut is clearly shown in Fig. 2, in which that portion of the nut to the left may be assumed to be a standard cut thread, and that portion to the right may be the abnormally arranged or cut thread. The operation will be apparent. Placing the nut upon a bolt, it may be readily turned thereon by the finger, forming what is called a finger fit, until the thread near the end of the bolt reaches the abnormally formed thread of the nut. At this point the fit becomes tight, and it will be necessary to use a wrench or other means to turn the nut up to its seat. When set satisfactorily, however, the nut is substantially rigid and firm, and does not tend to back off or become accidentally disengaged.

The change from one form or pitch of thread to the other should always be less than a single thread in extent, else the nut cannot be properly engaged with the bolt.

Obviously, the same result can be obtained by using the two taps, in which the first, as in Fig. 5, may be designed to cut an abnormal thread, as stated, while the second tap, as in Fig. 6, will follow and re-cut the threaded part partway through the nut to the required pitch and helix adapted to engage the particular bolt to which it is adapted to be applied.

Fig. 3 shows a longitudinal section, in a somewhat exaggerated form, of one form of nut which may readily be constructed in accordance with my invention, and which will operate as described, while Fig. 4 illustrates the effect of the nut, as it reaches the point where there is a departure from the normally formed thread to the abnormally formed thread. The curved line, indicates in exaggerated form the curve of frictional contact and engagement of the walls of the thread in the nut with the walls of the thread on the bolt. This frictional engagement will be to a greater or less extent resilient, depending upon the resiliency of the extending wall of the thread on the bolt or nut, or both, and from what might be termed a spring contact or lock between the nut and its bolt. A somewhat similar result may be secured by using the form of tap shown in Fig. 7, in which one circumferential line of cutters, as at e, is removed, thus making the change from one form or pitch of the thread an abrupt one.

It is obvious that variations may be made in the steps as described, the method, however, being substantially the same. The completed nut will be substantially as described.

By the term "form" in the claims, I wish to be understood as meaning any modification in the thread, including the pitch or helix, that will accomplish the result sought.

Having described my invention, what I claim as new and desire to secure by Letters Patent is:—

1. The method of forming a threaded bolt nut, consisting in cutting a thread therein slightly varying in form, to that of the thread of the bolt, and then recutting a part of said threaded portion to conform to the bolt thread in the usual manner, the change from one form of thread to the other being comparatively abrupt.

2. The method of forming a threaded bolt nut by a single operation, consisting in cutting the thread thereof with a tap having its initial cutting part formed to cut the thread in a certain form, and another part arranged to cut part way through the nut forming the thread of slightly different shape, the change from one form to the other being comparatively abrupt.

In testimony whereof, I have hereunto signed my name in the presence of two subscribing witnesses.

WILLIAM ERASTUS SHARP.

Witnesses:
   JOHN W. HILL,
   CHARLES I. COBB.